_(12)_ United States Patent
Tu et al.

(10) Patent No.: US 9,990,900 B2
(45) Date of Patent: Jun. 5, 2018

(54) IMAGE PROCESSING DEVICE AND METHOD THEREOF

(71) Applicant: MStar Semiconductor, Inc., Hsinchu Hsien (TW)

(72) Inventors: Ying-Chieh Tu, New Taipei (TW); Wei-Hsiang Hong, Taipei (TW); Wan-Chan Hu, Hsinchu County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 2 days.

(21) Appl. No.: 14/503,750

(22) Filed: Oct. 1, 2014

(65) Prior Publication Data

US 2015/0091928 A1  Apr. 2, 2015

(30) Foreign Application Priority Data

Oct. 2, 2013  (TW) .............................. 102135699 A

(51) Int. Cl.
*G09G 5/00*  (2006.01)
*G09G 5/373*  (2006.01)
(Continued)

(52) U.S. Cl.
CPC ............. *G09G 5/005* (2013.01); *G09G 5/373* (2013.01); *H04N 19/428* (2014.11); *G09G 2340/02* (2013.01); *G09G 2340/04* (2013.01); *G09G 2350/00* (2013.01); *G09G 2360/02* (2013.01); *G09G 2370/16* (2013.01)

(58) Field of Classification Search
CPC ...... G09G 5/00; G09G 5/373; G09G 2360/02; G09G 2340/02; G09G 2350/00; G09G 2370/16; G09G 5/005; G09G 2340/04; H04N 19/423; H04N 19/428; G06T 5/002; G06T 2207/20172; A61M 21/00; A61M 2021/0044; A61M 2205/505; A61N 2005/0626; A61N 5/06
USPC ........... 345/547; 375/E7.125, 240.13, E7.17, 375/E7.147; 386/E9.013
See application file for complete search history.

(56) References Cited

U.S. PATENT DOCUMENTS 6,058,210 A * 5/2000 de Queiroz ............. G06T 9/007
382/173
2004/0013195 A1* 1/2004 Panusopone ..... H04N 21/23430
375/240.2
(Continued)

OTHER PUBLICATIONS

Taiwan Patent Office, "Office Action," dated May 14, 2015.

*Primary Examiner* — Yuehan Wang
*Assistant Examiner* — Michael Le
(74) *Attorney, Agent, or Firm* — WPAT, PC

(57) ABSTRACT

An image processing device that converts original image data to target image data is provided. The image processing device includes: a static random access memory (SRAM); an image scaling circuit that generates scaled image data according to the original image data and stores the scaled image data to the SRAM; and a video encoding circuit that accesses the scaled image data from the SRAM and encodes the accessed scaled image data to generate the target image data. The target image data corresponds to an image frame. A part of the target image data is intra frame data encoded by an intra frame compression method, and the other part of the target image data is predicted frame data encoded by a predicted frame compression method.

18 Claims, 6 Drawing Sheets

(51) Int. Cl.
*H04N 19/423* (2014.01)
*H04N 19/426* (2014.01)

(56) References Cited

U.S. PATENT DOCUMENTS

| | | | | |
|---|---|---|---|---|
| 2007/0110155 | A1* | 5/2007 | Sung | H04N 19/51 |
| | | | | 375/240.13 |
| 2007/0280357 | A1* | 12/2007 | Sung | H04N 21/4122 |
| | | | | 375/240.25 |
| 2008/0267284 | A1* | 10/2008 | Tsubaki | H04N 19/61 |
| | | | | 375/240.01 |
| 2010/0040299 | A1* | 2/2010 | Noh | H04N 19/172 |
| | | | | 382/233 |
| 2010/0110106 | A1* | 5/2010 | MacInnis | G06T 9/007 |
| | | | | 345/629 |
| 2012/0327997 | A1* | 12/2012 | Nilsson | H04N 19/176 |
| | | | | 375/240.02 |
| 2013/0039412 | A1* | 2/2013 | Narroschke | H04N 19/197 |
| | | | | 375/240.03 |
| 2015/0091927 | A1* | 4/2015 | Cote | G06T 1/60 |
| | | | | 345/547 |

\* cited by examiner

IMAGE PROCESSING DEVICE AND METHOD THEREOF

This application claims the benefit of Taiwan application Ser. No. 102135699, filed Oct. 2, 2013, the subject matter of which is incorporated herein by reference.

BACKGROUND OF THE INVENTION

Field of the Invention

The invention relates in general to an image processing device and method, and more particularly to an image processing device and method utilizing the Wireless Display (WiDi) technology.

Description of the Related Art

FIG. 1 shows a schematic diagram of a conventional image display system. An image display system 10 includes a dynamic random access memory (DRAM) 110, an image processing device 120 and a display device 130. The image processing device 120 includes an image scaling circuit 122 and an image processing unit 124. The DRAM 110 stores image data to be processed. The image scaling circuit 122 accesses image data from the memory 110, and performs a scaling process such as up-sampling or down-sampling on the image data. The image processing unit 124 then performs a process such as de-interlacing on the image data, and outputs the processed data to the display device 130 for further display.

FIG. 2 shows a schematic diagram of a conventional image display system utilizing the Wireless Display (WiDi) technology. An image display system 20 includes DRAMs 210 and 230, an image processing device 220, and a display apparatus 240. The image processing device 220 includes an image scaling circuit 222 and a multi-format video encoder (MFE) 226. After being processed by the image scaling circuit 222, the image data previously stored in the DRAM 210 is stored back into the DRAM 210. The MFE 226 then accesses the image data from the DRAM 210, encodes the accessed data, and stores the encoded data to the DRAM 230. The external display apparatus 240, e.g., a cell phone, computer or television, obtains and plays the data in the DRAM 230 via Wi-Fi.

One disadvantage of the above image processing device 220 is that, the data having been processed by the image scaling circuit 222 needs to be first stored back into the DRAM 210, and then accessed therefrom when needed by the MFE 226. In general, video data usually exists in large amounts, which may get increasingly substantial as the resolution supported by the display apparatus 240 gets higher. When processing video data, the image scaling circuit 222 performs one read operation and one write operation on the DRAM 210, and the MFE 226 also performs one read operation on the same DRAM 210. As the video data amount increases, these read and write operations may occupy a large memory bandwidth, such that signal delays are likely incurred if the speed of the memory is not fast enough. For the WiDi technology, real-time and smooth image playback is essential, and excessive delays in playback may result undesirable user experiences.

SUMMARY OF THE INVENTION

The invention is directed to an image processing device and an image processing method for enhancing image processing performance as well as satisfying real-time transmission requirements of the WiDi technology.

The present invention discloses an image processing device that converts original image data to target image data. The image processing device includes: a static random access memory (SRAM); an image scaling circuit, coupled to the SRAM, configured to generate scaled image data according to the original image data and to store the scaled image data to the SRAM; and a video encoding circuit, coupled to the SRAM, configured to access the scaled image data from the SRAM and to encode the accessed scaled image data to generate the target image data. The target image data corresponds to an image frame. A part of the target image data is intra frame data encoded by an intra frame compression method, and the other part of the target frame data is predicted frame data encoded by a predicted frame compression method.

The present invention further discloses an image processing method for converting original image data to target image data. The image processing method includes: generating scaled image data according to the original image data; storing the scaled image data to an SRAM; accessing the scaled image data from the SRAM; and encoding the scaled image data to generate the target image data. The target image data corresponds to an image frame. A part of the target image data is intra frame data encoded by an intra frame compression method, and the other part of the target frame data is predicted frame data encoded by a predicted frame compression method.

In the image processing device and method of the present invention, an SRAM in the image processing device is utilized to replace an external dynamic random access memory (DRAM) to reduce the number of times that the DRAM is accessed. Compared to the prior art, the present invention utilizes an SRAM having a faster speed and is thus more suitable for the WiDi technology that has high demands on the system response time.

The above and other aspects of the invention will become better understood with regard to the following detailed description of the preferred but non-limiting embodiments. The following description is made with reference to the accompanying drawings.

DETAILED DESCRIPTION OF THE INVENTION

Technical terms of the application are based on general definition in the technical field of the application. If the application describes or explains one or some terms, definitions of the terms are based on the description or explanation of the application.

The present invention discloses an image processing device and an image processing method capable of increasing a response speed of an image system that utilizes the Wireless Display (WiDi) technology. The device and the method are applicable to image systems such as those for the WiDi technology that demands a high response speed. In possible implementation, one skilled person in the art may choose equivalent elements or steps to implement the disclosure based on the disclosure of the application. That is, the implementation of the disclosure is not limited by the embodiments disclosed in the disclosure. Further, a part of the elements included in the image processing device of the disclosure are individually known elements. Without affecting the full disclosure and possible implementation of the device, details of the known elements are omitted. Further, the image processing method of the present invention may be implemented by the image processing device of the disclosure or an equivalent device. Without affecting the full disclosure and possible implementation of the method of the disclosure, the description of the method focuses on the steps of the method instead of hardware.

Figure 1:
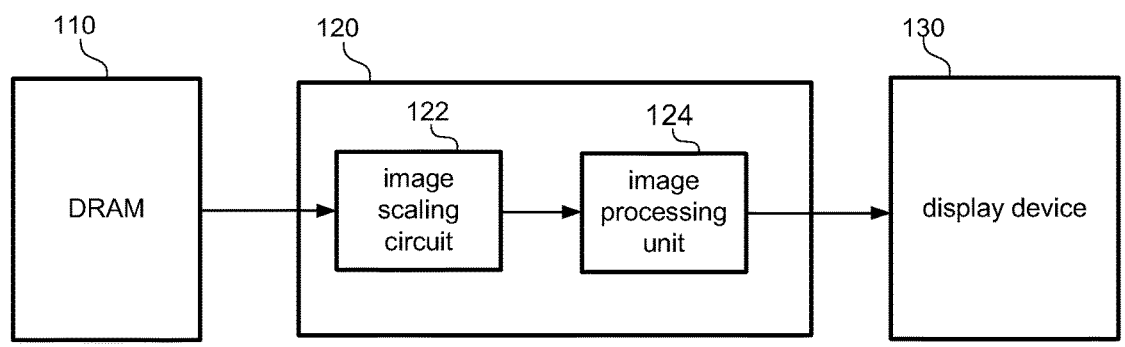
FIG. 1 is a schematic diagram of a conventional image display system.
Figure 2:
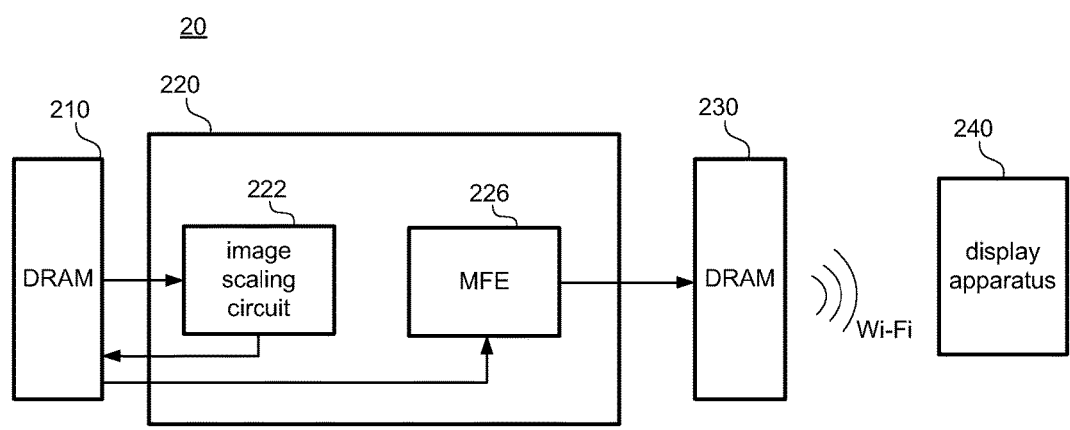
FIG. 2 is a schematic diagram of an image display system that utilizes the Wireless Display (WiDi) technology.
Figure 3:
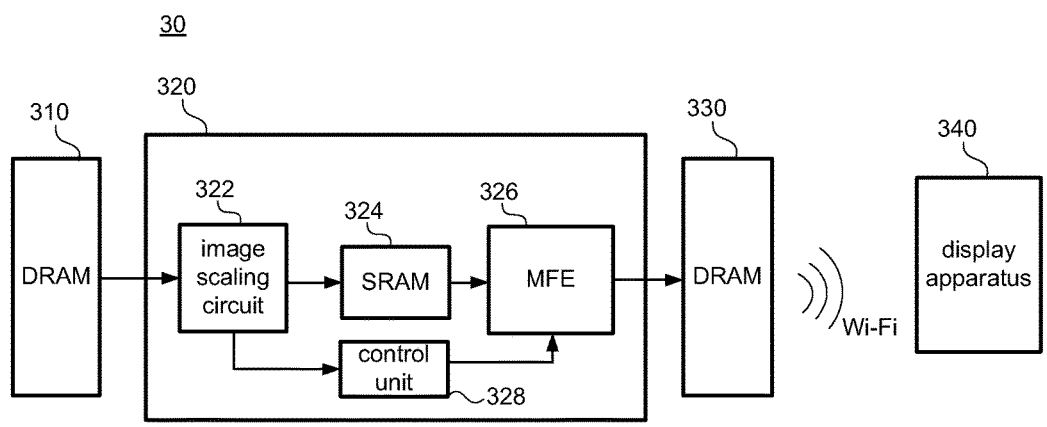
FIG. 3 is an image display system utilizing an image processing device of the present invention.

FIG. 3 shows an image display system 30 utilizing an image processing device of the present invention. The image display system 30 includes dynamic random access memories (DRAMs) 310 and 330, an image processing device 320, and a display apparatus 340. The image processing device 320 includes an image scaling circuit 322, a static random access memory (SRAM) 324, a multi-format video encoder (MFE) 326, and a control unit 328. The image scaling circuit 322 accesses image data from the DRAM 310 coupled to the image scaling circuit 322, performs a scaling process such as up-sampling or down-sampling the image data, and stores the processed image data to the SRAM 324. The MFE 326 then accesses the image data from the SRAM 324, encodes the image data to bitstream data compliant to the WiDi specification, and stores the bitstream data to the DRAM 330. The display apparatus 340 obtains the image data via Wi-Fi and plays the image data. The control unit 328 is coupled to the image scaling circuit 322 and the MFE 326. When the image scaling circuit 322 has fully stored the data required by the MFE 326 to the SRAM 324, the image scaling circuit 324 sends a notification signal to the control unit 328. According to the notification signal, the control unit 328 controls the MFE 326 to access the data that is ready to be accessed from the SRAM 324.

Figure 4:
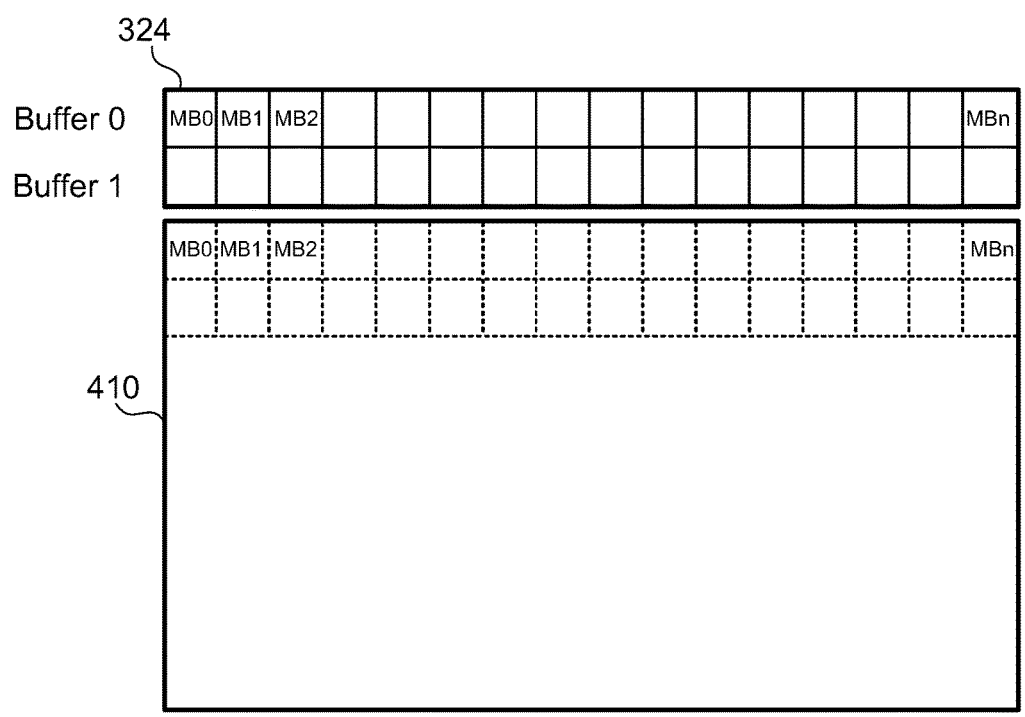
FIG. 4 is a relationship diagram of a storage space and stored data in an SRAM of an image processing device of the present invention.

FIG. 4 shows a relationship diagram of a storage space and WiDi image data in an SRAM of an image processing device of the present invention. Image data that the MFE 326 processes each time is usually a part of a frame 410, and is frequently in a unit of macroblock (MB). For example, the frame 410 in FIG. 4 is divided into (n+1) sections, with macroblocks MB0 to MBn respectively corresponding to the sections. Each macroblock includes k*k pixels (where k is a positive integer), and so the data included in each macroblock is a part of the data of corresponding a k number of pixel lines. To correspond to the frame 410, a memory block Buffer 0 also includes macroblocks MB0 to MBn. That is, one memory block at least stores data of a k number of pixels lines.

When storing the image data to the SRAM 324, the image scaling circuit 322 first completely accesses data of one pixel line and then accesses data of next pixel line. Having stored a k number of pixel lines, one memory block is filled, and the data of macroblocks MB0 to MBn at this point also become complete. That is to say, the MFE 326 can only start processing image data when one memory block is filled by the image data. Therefore, a time point at which the image scaling circuit 322 sends the notification signal is a time point at which one memory block, e.g., Buffer 0, is filled. The MFE 326 then sequentially accesses the data of the macroblocks MB0 to MBn from the memory block Buffer 0 according to the control of the control unit 328. At this point, starting from the $(k+1)^{th}$ pixel line, the image scaling circuit 322 may store the processed data to the memory block Buffer 1. Having filled the memory block Buffer 1, the image scaling circuit 322 sends a notification signal to the control unit 328 to prompt the MFE 326 to access data from the memory block Buffer 1, and starts to write data of the $(2k+1)^{th}$ pixel line and subsequent data to the memory block Buffer 0. Thus, the image scaling circuit 322 and the MFE 326 alternately access the two memory blocks of the SRAM 324. If hardware is not a consideration, the memory blocks Buffer 0 and Buffer 1 may be designed to have larger capacities. If hardware needs to be economized, the SRAM 324 may be designed to include only one memory block; the MFE 326 is halted from operations when the image scaling circuit 322 writes data to the SRAM 324, and the image scaling circuit 322 is halted from operations when the MFE 326 reads data from the SRAM 324. In the present invention, the size of the SRAM 324 needs to be at least the size of one memory block, i.e., be capable of at least storing data of a k number of pixel lines.

Figure 5:
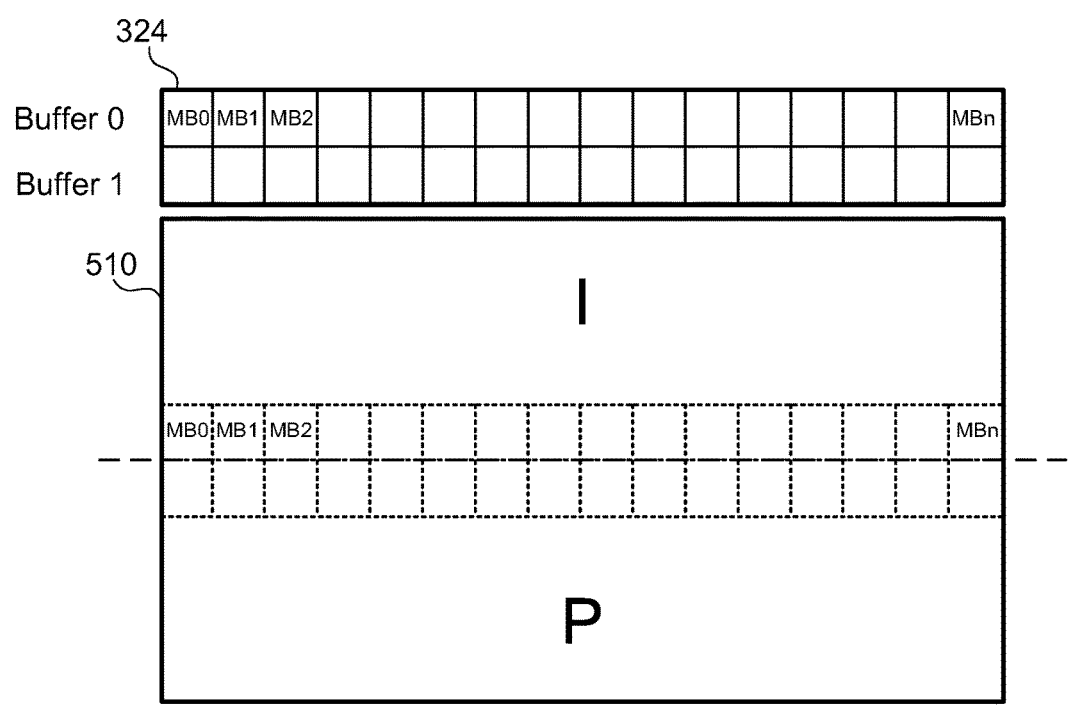
FIG. 5 is a relationship diagram of a storage space and WiDi image data in an SRAM of an image processing device of the present invention.

Image data is generally transmitted in form of an intra frame (I-frame) and a predicted frame (P-frame) to appropriately reduce the data amount. An intra-frame usually includes the data amount of one complete frame, whereas the data amount of a predicted frame is relatively smaller. A compression method for generating an intra frame is referred to as an intra frame compression method, and a compression method for generating a predicted frame is referred to as a predicted frame compression method. To prevent a surge in the data amount during the transmission of the intra frame having a large data amount from affecting the transmission stability, when compressing a certain frame, a part of frame data of the frame is compressed by the intra frame compression method to generate intra frame data and the other part of the frame data of the frame is compressed by the predicted frame compression method to generate predicted frame data. Then, the intra frame data and the predicted frame data are combined to form a complete compressed frame. As such, each complete compressed frame may be formed by intra frame data and predicted frame data to solve the stability issue caused by a particular frame having a large data amount during the transmission process. It should be noted that, the foregoing intra frame data and predicted frame data are respectively formed from compressing different parts of data of one frame, and are different from conventional intra frames and predicted frames. In other words, in a conventional solution, one complete frame is compressed by either the intra frame compression method or the predicted frame compression method to generate either an intra frame or a predicted frame. However, according to an embodiment of the present invention, a part of a complete frame is compressed by the intra frame compression method to generate the intra frame data, the other part of the frame is compressed by the predicted frame compression method to generate the predicted frame data, and the intra frame data and the predicted frame data are then combined into one complete compressed frame of the frame. FIG. 5 shows a relationship diagram of WiDi image data and a storage space in an SRAM of an image processing device of the present invention. A frame 510 includes partial frame data I to be compressed by the intra frame compression method, and partial frame data P to be compressed by the predicted frame compression method. The image scaling circuit 322 sequentially processes data of the frame 510 from the top to the bottom, and stores the processed data to the SRAM 324. The MFE 326 then accesses the processed data from the SRAM 324, accordingly encodes the accessed data to intra frame data or predicted frame data, and stores the encoded data to the DRAM 330. Therefore, according to the embodiment, at a particular time point, when the image scaling circuit 322 has completely processed data of the partial frame data I and prepares to start processing data of the partial frame data P, one of the memory blocks of the SRAM 324 stores the processed data of the partial frame data I to be accessed and to be compressed by the intra frame data compression method by the MFE 326, and the other memory block starts to store the processed data of the partial frame data P. At a later time point when the memory block that stores the processed data of the partial frame data P is filled, the MFE 326 then accesses the processed data of the partial frame data P from that memory block and compresses the accessed data by the predicted frame data compression method to encode the predicted frame data P. Therefore, the design of the two memory blocks allows the image processing device 320 of the present invention to be more suitably applied to WiDi compliant image signals.

Figure 6:
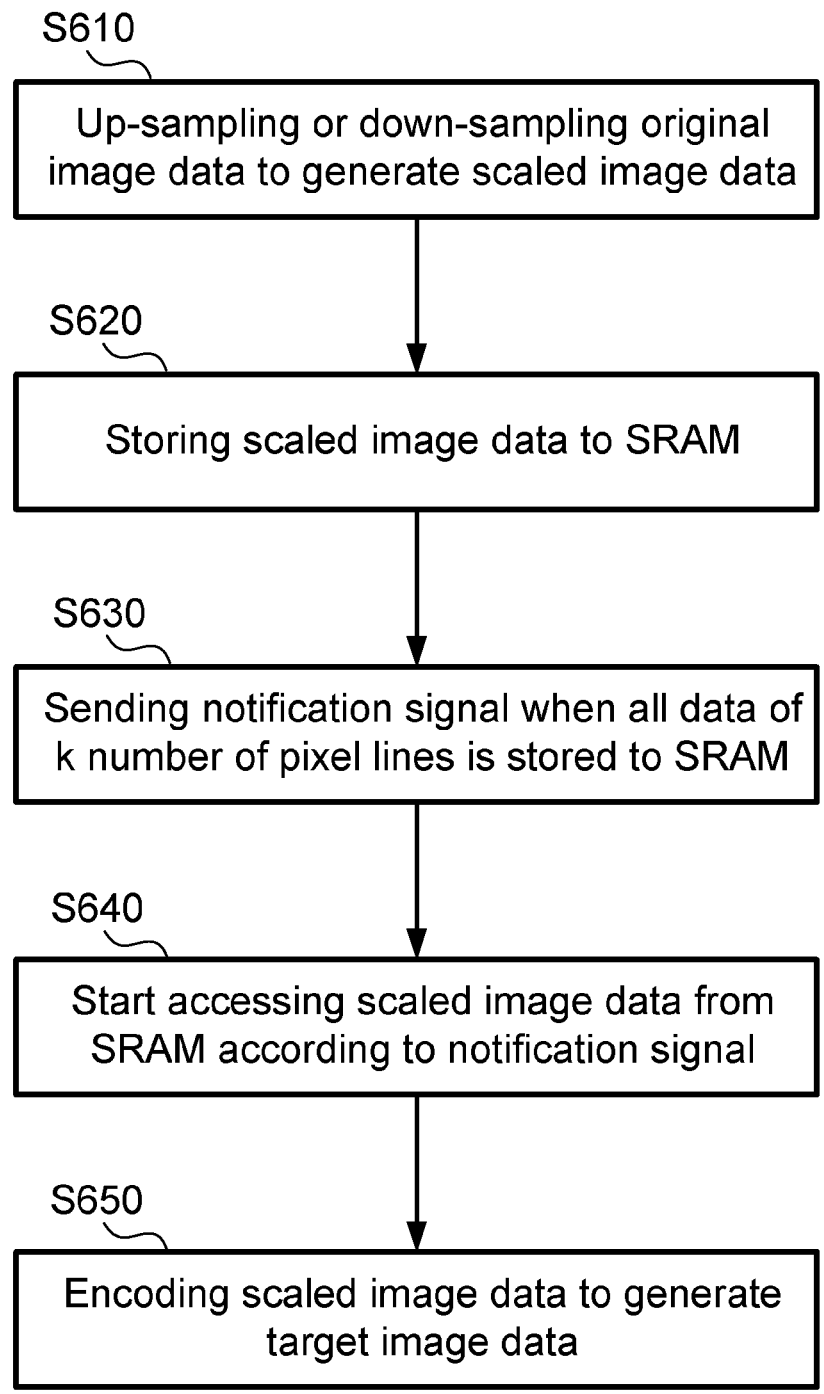
FIG. 6 is a flowchart of an image processing method according to an embodiment of the present invention.

FIG. 6 shows a flowchart of an image processing method according an embodiment of the present invention. In addition to the foregoing image processing device, the present invention further discloses an image processing method for a WiDi image display system to accelerate data processing that satisfies the requirements of the WiDi technology for real-time data transmission. The method is performed by the foregoing image processing device 320 or an equivalent device. As shown in FIG. 6, the method according to an embodiment of the present invention includes the following steps.

In step S610, original image data is up-sampled or down-sampled to generate scaled image data. In general, resolutions of panels of display apparatuses are different. Therefore, the original image needs to be scaled such that the scaled image data satisfies the resolution of the display apparatus.

In step S620, the scaled image data is stored to an SRAM. When writing the scaled image data to the SRAM, one pixel line is fully accessed before accessing a next pixel line.

In step S630, when all data of a k number of pixel lines is stored to the SRAM, a notification signal is sent. In a WiDi system, an image is processed in a unit of a macroblock. When a macroblock includes k*k pixels (where k is a positive integer), the SRAM needs to store data of a k number of pixels lines to generate at least one complete block. Thus, when the SRAM is filled by a k number of pixel lines, a notification signal is sent to indicate that a next step can be performed.

In step S640, accessing of the scaled image data from the SRAM is started according to the notification signal. In this step, data is accessed from the SRAM in a unit of a macroblock having k*k pixels, which is equivalently accessing a part of data of each pixel line of the k number of pixel lines each time, as shown in FIG. 4. It should be noted that, in this step, only a part of the data of each pixel line is used after having accessed a k number of pixel lines, or only a part of the data of each pixel line is accessed according to a designated accessing position. Further, when the SRAM includes two memory blocks (with each block at least storing data of a k number of pixel lines), while performing step S640 of accessing data from the first memory block, step S620 may write processed data to the second memory block. Thus, step S620 to Step S640 may be performed to alternately read and write the memory blocks. However, the SRAM may also include only one memory block, and step S620 and Step S640 then cannot be simultaneously performed.

In step S650, the scaled image data is encoded to generate target image data. The encoded target image data is compliant to an image transmission format of the WiDi technology, and can be transmitted to a display apparatus via Wi-Fi.

To promote data transmission, the WiDi technology reduces the data amount of an intra frame, and a complete compressed frame may at the same time include intra frame data and predicted frame data. Further, referring to FIG. 5, when an SRAM includes two memory blocks, at a particular time point, step S620 and step S640 that are simultaneously performed store the partial frame data P to be compressed by the predicted frame compression method to one of the memory blocks of the SRAM, and access the partial frame data I to be compressed by the intra frame compression method from the other memory block of the SRAM. At a later time point, when the memory block that stores the data of the partial frame data P is filled, step S640 accesses the data of the partial frame data P and compresses the accessed partial frame data P by the predicted frame compression method to encode the predicted frame data P. The design of the two memory blocks allows the image processing method of the present invention to be more suitably applied to WiDi compliant image signals.

One person skilled in the art can understand details and possible implementation variations of the method in FIG. 6 according to the disclosure of the device in FIG. 3 with reference of the memory storage methods in FIG. 4 and FIG. 5. Without affecting the full disclosure and possible implementation, such repeated description is omitted herein. In possible implementation, one skilled person in the art would selectively implement part or all technical features of any embodiment of the application or selectively combine part or all technical features of the embodiments of the application based on the disclosure of the present invention to enhance the implementation flexibility of the present invention. Further, although the WiDi technology is taken as an example in the foregoing embodiments, based on the disclosure of the present invention, one person skilled in the art may appropriately apply the present invention to other types of image processing devices.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image processing device, that converts a first original image data and a second original image data to a first target image data and a second target image data for a wireless transmission, comprising:
   a static random access memory (SRAM), comprising a first memory block and a second memory block;
   an image scaling circuit, for generating a first scaled image data and a second scaled image data from reading the first original image data and the second original image data from a dynamic random access memory (DRAM), and to store the first scaled image data in said first memory block and the second scaled image data in said second memory block; and an encoding circuit, for generating the first target image data by compressing said first scaled image data from said first memory block with a first compression method, generating the second target image data by compressing said second scaled image data from said second memory block with a second compression method different from said first compression method, and forming a first complete frame by combining said first target image data and said second target image data in distinct spatial block parts of said first complete frame.

2. The image processing device according to claim 1, further comprising:
a control unit, coupled to the image scaling circuit and the encoding circuit;
wherein, the image scaling circuit sends a notification signal to the control unit, which controls the encoding circuit to start encoding according to the notification signal.

3. The image processing device according to claim 1, wherein the first scaled image data comprises a K number of pixel lines, the encoding circuit accesses and encodes the K number of pixel lines from the SRAM, and K is a positive integer.

4. The image processing device according to claim 3, wherein a size of the SRAM is equal to or larger than a data amount of the K number of pixel lines.

5. The image processing device according to claim 3, wherein sizes of the first and second memory blocks are equal to or larger than a data amount of the K number of pixel lines.

6. The image processing device according to claim 1, the encoding circuit accesses the second memory block while the image scaling circuit accesses the first memory block.

7. The image processing device according to claim 1, wherein said first scaled image data is an intra frame and said second scaled image data is a predicted frame.

8. The image processing device according to claim 1, wherein said encoding circuit generates a third target image data of a second complete frame by compressing a third scaled image data read from said first memory block with said first compression method;
wherein said first target image data and said third target image data occupy the same spatial block part portion of said first complete frame and said second complete frame, respectively;
wherein said third target image data has an equivalent data amount to said first target image data.

9. The image processing device according to claim 1, wherein said encoding circuit applies said first compression method on data read from said first memory block and said second compression method on data read from said second memory block.

10. An image processing method, for converting a first original image data and a second original image data to a first target image data and a second target image data for wireless transmission, comprising:
generating a first scaled image data according to the first original image data read from a dynamic random access memory (DRAM);
generating a second scaled image data according to the second original image data read from said DRAM;
providing a static random access memory (SRAM), wherein said SRAM comprises a first memory block and a second memory block;
storing the first scaled image data to said first memory block and the second scaled image data into said second memory block;
accessing the first scaled image data from said first memory block and the second scaled image data from said second memory block; and
encoding the first scaled image data with a first compression method to generate a first target image data and encoding the second scaled image data with a second compression method different from said first compression method to generate the second target image data to be provided to a display by wireless transmission, wherein a first complete frame is formed by combining said first target image data and said second target image data in distinct spatial block parts of said first complete frame.

11. The image processing method according to claim 10, further comprising:
sending a notification signal when the first scaled image data is stored to the first memory block;
wherein, the step of accessing the first scaled image data from the first memory block is performed according to the notification signal.

12. The image processing method according to claim 10, wherein the first scaled image data comprises a K number of pixel lines, the step of accessing the first scaled image data from the first memory block further comprises accessing and encoding the K number of pixel lines from the first memory block, and K is a positive integer.

13. The image processing method according to claim 12, wherein a size of the SRAM is equal to or larger than a data amount of the K number of pixel lines.

14. The image processing method according to claim 12, wherein sizes of the first and second memory blocks are equal to or larger than a data amount of the K number of pixel lines.

15. The image processing method according to claim 10, wherein storing first scaled image data to the first memory block at a first time point, and accessing second scaled image data from the second memory block access at same first time point.

16. The image processing method according to claim 10, wherein said first scaled image data is an intra frame and said second scaled image data is a predicted frame.

17. The image processing method according to claim 10, further comprising:
encoding a third scaled image data read from said first memory block with said first compression method to generate a third target image data of a second complete frame;
wherein said first target image data and said third target image data occupy the same spatial block part portion of said first complete frame and said second complete frame, respectively;
wherein said third target image data has an equivalent data amount to said first target image data.

18. The image processing method according to claim 10, wherein said step of encoding further comprising:
applying said first compression method on data read from said first memory block and applying said second compression method on data read from said second memory block.

* * * * *